(12) United States Patent
Tsuchida et al.

(10) Patent No.: US 10,936,967 B2
(45) Date of Patent: Mar. 2, 2021

(54) INFORMATION PROCESSING SYSTEM, INFORMATION PROCESSING METHOD, AND RECORDING MEDIUM FOR LEARNING A CLASSIFICATION MODEL

(71) Applicant: NEC Corporation, Tokyo (JP)

(72) Inventors: Masaaki Tsuchida, Tokyo (JP); Kentarou Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 951 days.

(21) Appl. No.: 15/529,330

(22) PCT Filed: Nov. 16, 2015

(86) PCT No.: PCT/JP2015/005694
§ 371 (c)(1),
(2) Date: May 24, 2017

(87) PCT Pub. No.: WO2016/084326
PCT Pub. Date: Jun. 2, 2016

(65) Prior Publication Data
US 2017/0330108 A1 Nov. 16, 2017

(30) Foreign Application Priority Data
Nov. 26, 2014 (JP) .............................. JP2014-238829

(51) Int. Cl.
*G06N 20/00* (2019.01)
*G06F 16/28* (2019.01)
*G06F 16/00* (2019.01)

(52) U.S. Cl.
CPC ............. *G06N 20/00* (2019.01); *G06F 16/00* (2019.01); *G06F 16/285* (2019.01)

(58) Field of Classification Search
CPC ........ G06F 16/215; G06F 17/30; G06F 19/00; G06F 15/18; G06F 16/24564; G06N 5/04;
(Continued)

(56) References Cited

U.S. PATENT DOCUMENTS

2014/0222719 A1* 8/2014 Poulin ..................... G06N 5/04
706/11
2015/0278603 A1* 10/2015 Boriah ................. G06K 9/0063
382/103

FOREIGN PATENT DOCUMENTS

JP 2009-093334 4/2009

OTHER PUBLICATIONS

Dembczynski et al. "An Exact Algorithm for F-Measure Maximization", NIPS 2011, pp. 9.*
(Continued)

*Primary Examiner* — Li Wu Chang
(74) *Attorney, Agent, or Firm* — Finnegan, Henderson, Farabow, Garrett & Dunner, L.L.P.

(57) ABSTRACT

A classification model with a high precision ratio at a high recall ratio is learned. A classification model learning system (100) includes a learning data storage unit (110) and a learning unit (130). The learning data storage unit (110) stores pieces of learning data each of which has been classified as a positive example or a negative example. The learning unit (130) learns, by using the pieces of learning data, a classification model in such a way that a precision ratio of classification by the classification model is made larger under a constraint of a minimum value of a recall ratio of classification by the classification model.

9 Claims, 3 Drawing Sheets

(58) Field of Classification Search
CPC ............ G06N 3/04; G06N 5/02; G06N 20/00;
G06Q 10/04; G06Q 40/02; G16H 50/20;
H04N 1/40
See application file for complete search history.

(56) References Cited

OTHER PUBLICATIONS

International Search Report and Written Opinion dated Feb. 9, 2016, in corresponding PCT International Application.

Martin Jansche; "Maximum Expected F-Measure Training of Logistic Regression Models", Proceedings of Human Language Technology Conference and Conference on Empirical Methods in Natural Language Processing (HLT/EMNLP), pp. 692-699, (2005).

Daichi Takatori et al; "Improvement of Support Vector Machine by Removing Outliers and its Application to Shot Boundary Detection", Proceedings of 19th Data engineering workshop of The Institute of Electronics, Information and Communication Engineers (IEICE) [On-line]. Apr. 7, 2008, [Retrieve date Feb. 1, 2016], Internet : <URL : http://www.ieice.org/iss/de/DEWS/DEWS2008/proceedings/files/e2/e2-6.pdf>, pp. 1-7, ISSN 1347-4413, pp. 1-7, (2008).

\* cited by examiner

INFORMATION PROCESSING SYSTEM, INFORMATION PROCESSING METHOD, AND RECORDING MEDIUM FOR LEARNING A CLASSIFICATION MODEL

CROSS-REFERENCE TO RELATED PATENT APPLICATIONS

This application is a National Stage Entry of International Application No. PCT/JP2015/005694, filed Nov. 16, 2015, which claims priority from Japanese Patent Application No. 2014-238829, filed Nov. 26, 2014. The entire contents of the above-referenced applications are expressly incorporated herein by reference.

TECHNICAL FIELD

The present invention relates to an information processing system, an information processing method, and a recording medium, and particularly relates to an information processing system, an information processing method, and a recording medium for learning a classification model.

BACKGROUND ART

In a system monitoring a large number of phenomena, it is required to monitor important phenomena without overlooking. For example, in a text analysis system monitoring texts containing critical contents, it is required to monitor texts, which contains important contents such as illegality information, compliance violation information, disaster information, without omission. In the above-mentioned monitoring system, it is actually difficult to monitor all of the phenomena from a cost point of view.

Then, in order to reduce the cost, it is conceivable to support monitoring by defining a class to which a phenomenon to be monitored belongs as a positive example and a class to which a phenomenon not to be monitored belongs as a negative example, and classifying an input phenomenon as a positive example or a negative example. In this case, a function (classification model) to output a classification probability is used for classifying a phenomenon as a positive example or a negative example.

Here, four types are defined as types of the number of classification results outputted by the classification model.
1) The number of times that a positive example is correctly classified as a positive example (TP: TruePositive)
2) The number of times that a positive example is incorrectly classified as a negative example (FN: FalseNegative)
3) The number of times that a negative example is incorrectly classified as a positive example (FP: FalsePositive)
4) The number of times that a negative example is correctly classified as a negative example (TN: TrueNegative)

In order to monitor important phenomena as much as possible without overlooking, it is necessary to assign a smaller value to a threshold value which is applied to the classification probability outputted by the classification model for classifying a positive example or a negative example. However, in the case of assigning a smaller value to the threshold value, TP becomes increasing, but also FP becomes increasing at the same time. As a result, the number of phenomena to be monitored (phenomena which are classified as a positive example) becomes extremely large. In order to limit the number of phenomena to be monitored to the number of phenomena which can be practically monitored, it is necessary to decrease FP as much as possible in the case a smaller value is assigned to the threshold value.

Here, assigning a smaller value to the threshold value corresponds to increasing a recall ratio (a ratio of phenomena classified as a positive example to all of positive phenomena), and decreasing FP corresponds to increasing a precision ratio (a ratio of phenomena being actually a positive example to the phenomena classified as a positive example). That is, in order to limit the number of phenomena to be monitored to the number of phenomena which can be practically monitored, it is necessary to achieve a high precision ratio when a recall ratio is high.

In general, in order to improve the recall ratio, it is necessary to increase TP, and in order to improve the precision ratio, it is necessary to decrease FP. However, since there is a tradeoff relation between TP and FP that, when TP is increased, also FP is increased, it is difficult to realize both of improvement of the recall ratio and improvement of the precision ratio at the same time.

One example of a learning method of a classification model is described, for example, in NPL 1. According to the learning method described in NPL 1, a logistic regression is used as a classification model. Here, expected values of three types of classification results TP, FN and FP are expressed by use of a parameter $\theta$ of the classification model. Using TP, FN and FP, the precision ratio and the recall ratio are expressed as Math. 1 and Math. 2 respectively.

$$\text{Precision Ratio: } P(\theta) = \frac{TP(\theta)}{TP(\theta) + FP(\theta)} \qquad [\text{Math. 1}]$$

$$\text{Recall Ratio: } R(\theta) = \frac{TP(\theta)}{TP(\theta) + FN(\theta)} \qquad [\text{Math. 2}]$$

Then, an objective function expressing an expected value of a F value which is a weighted harmonic mean of the precision ratio and the recall ratio is expressed as Math.3.

$$F \text{ value: } F(\theta) = \frac{(1 + \beta^2) \times P(\theta) \times R(\theta)}{P(\theta) + \beta^2 R(\theta)} \qquad [\text{Math. 3}]$$

The parameter $\theta$ of the classification model is estimated (leaned) by finding out a parameter $\theta$ which maximizes the objective function of Math. 3. Here, a weight $\beta$ is a positive real number. The recall ratio is more emphasized as the $\beta$ is larger.

CITATION LIST

Non Patent Literature

[NPL 1] Martin Jansche, "Maximum Expected F-Measure Training of Logistic Regression Models", Proceedings of Human Language Technology Conference and Conference on Empirical Methods in Natural Language Processing (HLT/EMNLP), pages 692-699, October 2005

SUMMARY OF INVENTION

Technical Problem

However, the learning method described in the above-mentioned NPL 1 has a technical problem that it is impossible to learn a classification model with a high precision ratio at a high recall ratio. The reason is that, in the case that the recall ratio is emphasized by increasing the weight β, weights of the recall ratio and the precision ratio in the tradeoff relation change. In this case, the precision ratio may be small as far as the recall ratio is high in the objective function.

An object of the present invention is to solve the above-mentioned problem, and to provide an information processing system, an information processing method, and a recording medium which can learn a classification model with a high precision ratio at a high recall ratio.

Solution to Problem

An information processing system according to an exemplary aspect of the present invention includes: a learning data storage means for storing pieces of learning data each of which has been classified as a positive example or a negative example; and a learning means for learning, by using the pieces of learning data, a classification model in such a way that a precision ratio of classification by the classification model is made larger under a constraint of a minimum value of a recall ratio of classification by the classification model.

An information processing method according to an exemplary aspect of the present invention includes: obtaining pieces of learning data each of which has been classified as a positive example or a negative example; and learning, by using the pieces of learning data, a classification model in such a way that a precision ratio of classification by the classification model is made larger under a constraint of a minimum value of a recall ratio of classification by the classification model.

A computer readable storage medium according to an exemplary aspect of the present invention records thereon a program causing a computer to perform a method including: obtaining pieces of learning data each of which has been classified as a positive example or a negative example; and learning, by using the pieces of learning data, a classification model in such a way that a precision ratio of classification by the classification model is made larger under a constraint of a minimum value of a recall ratio of classification by the classification model.

Advantageous Effects of Invention

A technical effect of the present invention is that it is possible to learn a classification model with a high precision ratio at a high recall ratio.

DESCRIPTION OF EMBODIMENTS

The example embodiment of the present invention will be described in detail with reference to drawings. Here, a direction of an arrow used in the drawing is merely exemplified, and does not impose any limitation on the example embodiment of the present invention.

Figure 2:
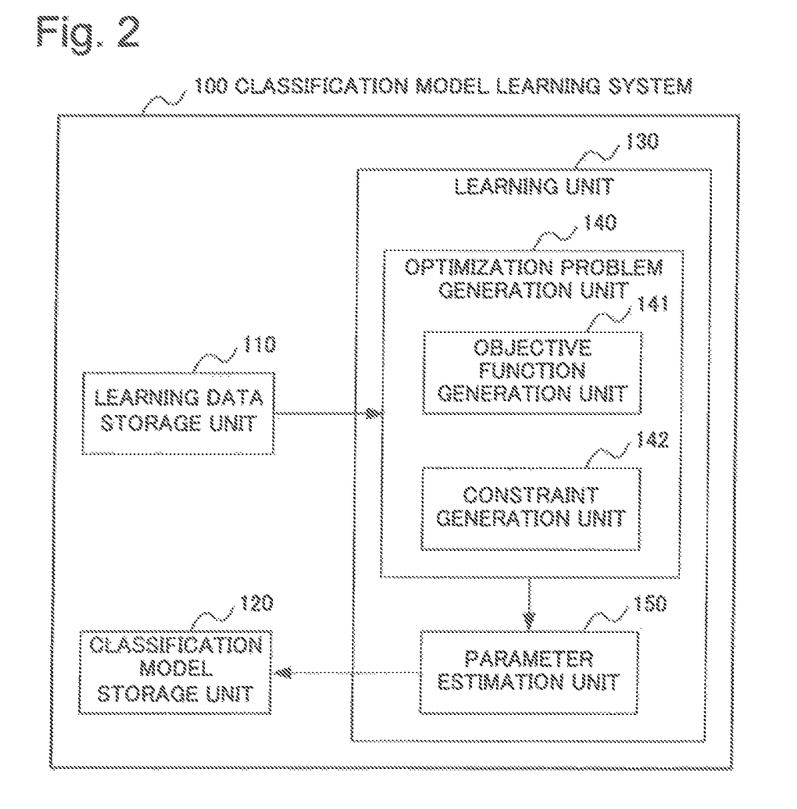
FIG. 2 is a diagram illustrating a configuration of a classification model learning system 100 in the example embodiment of the present invention.

Firstly, a configuration of the example embodiment of the present invention will be described. FIG. 2 is a diagram illustrating a configuration of a classification model learning system 100 in the example embodiment of the present invention. The classification model learning system 100 is one example embodiment of an information processing system of the present invention. The classification model learning system 100 learns a classification model used for monitoring, for example, texts that contain critical contents expressing an important phenomenon.

Referring to FIG. 2, the classification model learning system 100 in the example embodiment of the present invention includes a learning data storage unit 110, a classification model storage unit 120 and a learning unit 130.

The learning data storage unit 110 stores learning data used for learning a classification model.

The classification model storage unit 120 stores parameters of the classification model learned by the learning unit 130.

The learning unit 130 learns the classification model. The learning unit 130 includes an optimization problem generation unit 140 and a parameter estimation unit 150.

The optimization problem generation unit 140 generates a constrained mathematical-optimization problem for learning the classification model (hereafter, referred to as constrained optimization problem) based on the learning data. The optimization problem generation unit 140 includes an objective function generation unit 141 and a constraint generation unit 142.

The objective function generation unit 141 generates an objective function relating to a precision ratio.

The constraint generation unit 142 generates a constraint relating to a recall ratio.

The parameter estimation unit 150 learns the parameters of the classification model by finding out a solution of the generated constrained optimization problem.

The classification model learning system 100 may be a computer which includes CPU (Central Processing Unit) and a storage medium storing a program, and works with control based on the program.

Figure 3:
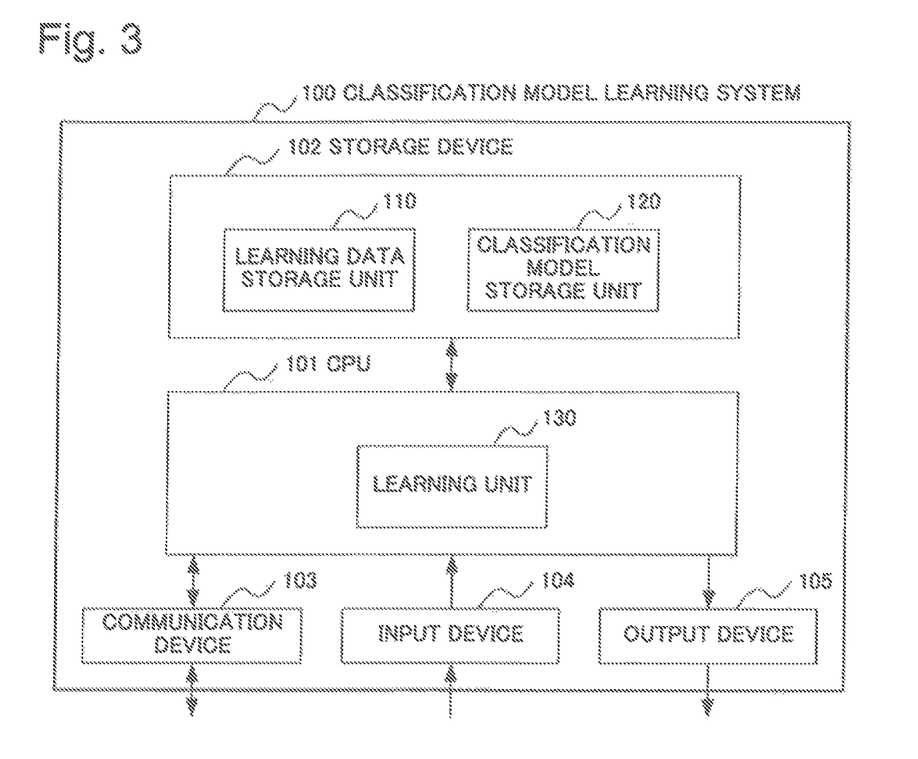
FIG. 3 is a block diagram illustrating a configuration of the classification model learning system 100, which is realized by a computer, in the example embodiment of the present invention.

FIG. 3 is a block diagram illustrating a configuration of the classification model learning system 100, which is realized by the computer, in the example embodiment of the present invention.

The classification model learning system 100 includes CPU 101, a storage device (storage medium) 102 such as a hard disc, a memory or the like, a communication device 103 for communicating with another apparatus or the like, an input device 104 such as a mouse, a keyboard or the like, and an output device 105 such as a display or the like.

CPU 101 carries out a computer program for realizing the function of the learning unit 130. The storage device 102 stores data of the learning data storage unit 110 and data of the classification model storage unit 120. The communication device 103 obtains learning data from another apparatus or the like. Moreover, the communication device 103 outputs a learning result (the parameters of the classification model) to another apparatus or the like. Moreover, the input device 104 may obtain learning data from a user or the like, and the output device 105 may output a learning result to the user or the like.

Alternatively, the classification model learning system 100 may have a configuration that components illustrated in FIG. 2 are distributed to a plurality of physical apparatuses which are connected each other through wired or wireless connections.

Alternatively, the components of the classification model learning system 100 may be realized by logic circuits which are separated.

Next, the operation of the example embodiment of the present invention will be described.

In the example embodiment of the present invention, a logistic regression model is used as a classification model. Alternatively, another classification model such as a support vector machine, a neural network model or the like may be used as the classification model, as far as a classification probability can be calculated.

According to the logistic regression model, a probability (classification probability) $P(+|x;\theta)$ of a positive example (+) is expressed as Math. 4, where $\theta=(\theta_1, \theta_2, \ldots, \theta_n)$ is a n-dimensional parameter vector, and $x=(x_1, x_2, \ldots, x_n)$ is a n-dimensional feature vector.

Here, elements $x_1, x_2, \ldots, x_n$ of the feature vector are feature values indicating a phenomenon. Elements $\theta_1, \theta_2, \ldots, \theta_n$ of the parameter vector are parameters respectively relating to the feature values $x_1, x_2, \ldots, x_n$. For example, existence of a word or the number of the word in a text is used as the feature value.

$$P(+|x;\theta) = \frac{1}{1 + \exp(-x \cdot \theta)} \qquad \text{[Math. 4]}$$

A probability $P(-|x;\theta)$ of a negative example (−) is expressed as Math. 5 by use of the probability $P(+|x;\theta)$ of a positive example (+).

$$P(-|x;\theta) = 1 - P(+|x;\theta) \qquad \text{[Math. 5]}$$

According to classification based on the logistic regression model, in the case that a probability calculated for an input phenomenon according to Math. 4 is equal to or larger than a predetermined threshold value set by a user or the like, the phenomenon is classified as an object to be monitored (positive example).

Using Math. 4, an expected value of the number of times that a positive example is correctly classified as a positive example (TP), an expected value of the number of times that a negative example is incorrectly classified as a positive example (FP), and an expected value of the number of times that a positive example is incorrectly classified as a negative example (FN) are expressed as Math. 6, Math. 7, and Math. 8, respectively. Here, Minus denotes a set of feature vectors of the negative examples, and Plus denotes a set of feature vectors of the positive examples.

$$TP(\theta) = \sum_{x \in Plus} P(+|x;\theta) \qquad \text{[Math. 6]}$$

$$FP(\theta) = \sum_{x \in Minus} P(+|x;\theta) \qquad \text{[Math. 7]}$$

$$FN(\theta) = \sum_{x \in Plus} (1 - P(+|x;\theta)) \qquad \text{[Math. 8]}$$

Figure 5:
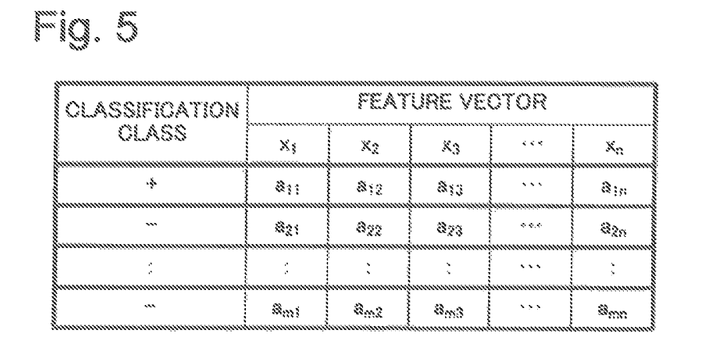
FIG. 5 is a diagram illustrating an example of learning data in the example embodiment of the present invention.

FIG. 5 is a diagram illustrating an example of pieces of learning data in the example embodiment of the present invention. Each of the pieces of learning data includes a classification class, and values of elements (feature values) $x_1, x_2, \ldots, x_n$ of a feature vector x. The example in FIG. 5 illustrates that a classification class of the first data is a positive example (+), and elements $x_1, x_2, \ldots, x_n$ have values of $a_{11}, a_{12}, \ldots, a_{1n}$ respectively. Here, it is assumed that the learning data illustrated in FIG. 5 is stored by the learning data storage unit 110.

Figure 4:
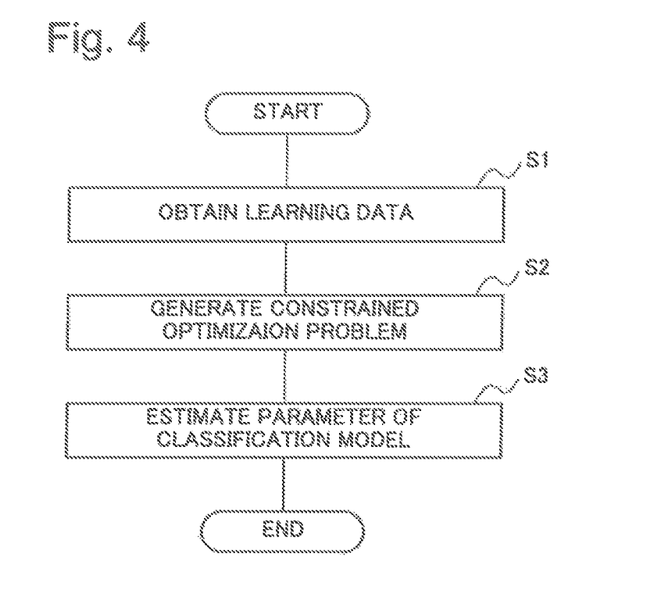
FIG. 4 is a flowchart illustrating an operation of the classification model learning system 100 in the example embodiment of the present invention.

FIG. 4 is a flowchart illustrating the operation of the classification model learning system 100 in the example embodiment of the present invention.

Firstly, the optimization program generation unit 140 obtains learning data from the learning data storage unit 110 (Step S1).

For example, the optimization program generation unit 140 obtains the learning data illustrated in FIG. 5.

Next, the optimization program generation unit 140 generates a constrained optimization problem used for learning a classification model (Step S2). Here, the objective function generation unit 141 of the optimization problem generation unit 140 generates an objective function relating to a precision ratio. The constraint generation unit 142 generates a constraint relating to the minimum value of a recall ratio.

The objective function generation unit 141 generates, as an objective function to make the precision ratio larger, an objective function whose object is to make an expected value of the number of times that a negative example is classified as a positive example smaller, by using feature values of feature vectors of the negative examples out of the pieces of learning data, and parameters of the classification model.

Here, in the case of generating a minimization problem, for example, an objective function such as Math. 9 or Math. 10 in which a coefficient of $FP(\theta)$ is positive and $FP(\theta)$ is set to the numerator, or an objective function such as Math. 11 in which a coefficient of $FP(\theta)$ is negative and $FP(\theta)$ is set to the denominator is generated.

$$\text{minimize } FP(\theta) \qquad \text{[Math. 9]}$$

$$\text{minimize } FP(\theta) - TP(\theta) \qquad \text{[Math. 10]}$$

$$\text{minimize } \frac{1}{-FP(\theta)} \qquad \text{[Math. 11]}$$

Alternatively, in the case of generating a maximization problem, for example, an objective function such as Math. 12 in which a coefficient of $FP(\theta)$ is negative and $FP(\theta)$ is set to the numerator, or an objective function such as Math. 13 or Math. 14 in which a coefficient of $FP(\theta)$ is positive and $FP(\theta)$ is set to the denominator is generated.

$$\text{maximize} -FP(\theta) \qquad \text{[Math. 12]}$$

$$\text{maximize} \frac{TP(\theta)}{FP(\theta)} \qquad \text{[Math. 13]}$$

$$\text{maximize} \frac{TP(\theta)}{TP(\theta)+FP(\theta)} \qquad \text{[Math. 14]}$$

Note that, as a method for preventing values of parameter vector $\theta$ from diverging when solving the optimization problem, a regularization is known. In the case of solving the minimization problem, the objective function generation unit 141 may regularize the objective function by adding a regularization term generated by multiplying $\Omega(\theta)$ which is calculated according to the regularization method and which will be mentioned later by a positive coefficient (C) as in Math. 15. In the case of solving the maximization problem, the objective function generation unit 141 may regularize the objective function by adding a regularization term generated by multiplying $\Omega(\theta)$ by a negative coefficient (-C) as in Math. 16.

$$\text{minimize } FP(\theta)+C\Omega(\theta) \qquad \text{[Math. 15]}$$

$$\text{maximize} \frac{TP(\theta)}{TP(\theta)+FP(\theta)} - C\Omega(\theta) \qquad \text{[Math. 16]}$$

Here, as $\Omega(\theta)$, a total of square values of the parameters $\theta_1, \theta_2, \ldots \theta_n$ (Tikhonov regularization) such as Math. 17, a total of absolute values of the parameters (Lasso regularization) such as Math. 18, or the like can be used. Moreover, as $\Omega(\theta)$, right sides of Math. 17 and Math. 18 are multiplied by predetermined coefficients $\lambda_1$ and $\lambda_2$ respectively, and a total of the two multiplication results (Elastic Net regularization) such as Math. 19 may be used.

$$\Omega(\theta) = \sum_{i=1}^{n} \theta_i^2 \qquad \text{[Math. 17]}$$

$$\Omega(\theta) = \sum_{i=1}^{n} |\theta_i| \qquad \text{[Math. 18]}$$

$$\Omega(\theta) = \lambda_2 \sum_{i=1}^{n} \theta_i^2 + \lambda_1 \sum_{i=1}^{n} |\theta_i| \qquad \text{[Math. 19]}$$

The constraint generation unit 142 generates, as a constraint relating to the recall ratio, a constraint relating to the minimum value of the recall ratio by using feature values of feature vectors of positive examples out of the pieces of learning data, and the parameters of the classification model.

Here, in the case that the constraint relating to the recall ratio is expressed, for each of positive examples, as an expected value of the number of times that each of positive examples is classified as a positive example, a constraint such as Math. 20 is generated. Alternatively, in the case that the constraint relating to the recall ratio is expressed, for all of the positive examples, as an expected value of the number of times that a positive example is classified as a positive among all of the positive examples, a constraint such as Math. 21 is generated. Here, r is the minimum value of the recall ratio.

$$\forall x \in \text{Plus } P(+|x;\theta) \geq r \qquad \text{[Math. 20]}$$

$$\frac{TP(\theta)}{TP(\theta)+FN(\theta)} \geq r \qquad \text{[Math. 21]}$$

Math. 20 means an overall recall ratio is made equal to or larger than r by making, for each of positive examples, an expected value of the number of times that each of positive examples is classified as a positive example equal to or larger than r. Math. 21 means an expected value of the recall ratio is made equal to or larger than r. Here, r is a real number from 0 to 1. For example, in the case that r is 0.9, the precision ratio is made larger under a constraint that the recall ratio is equal to or larger than 90%. A value of r is set by a user or the like.

The constrained optimization problem is generated as a combination of such an objective function and a constraint.

For example, the optimization problem generation unit 140 generates the objective function and the constraint by using values of the elements $x_1, x_2, \ldots, x_n$ of the feature vectors of each piece of the learning data illustrated in FIG. 5, and the parameters $\theta_1, \theta_2, \ldots, \theta_n$.

Finally, the parameter estimation unit 150 estimates the parameters of the classification model (learns the parameters) by finding out a solution of the generated constrained optimization problem according to the mathematical optimization method (Step S3). The parameter estimation unit 150 stores the learning result (the parameters of the classification model) in the classification model storage unit 120. Here, any method for solving an optimization problem with non-linear constraint such as an internal point method, a sequential quadratic optimization method, a barrier function method, or the like can be used as the mathematical optimization method.

For example, the parameter estimation unit 150 estimates values of the parameters $\theta_1, \theta_2, \ldots, \theta_n$ by solving the optimization problem generated for each piece of the learning data illustrated in FIG. 5.

As described above, the operations of the example embodiment of the present invention are completed.

Figure 1:
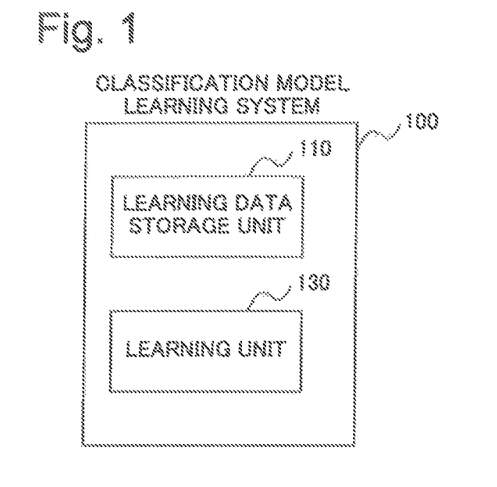
FIG. 1 is a block diagram illustrating a characteristic configuration of an example embodiment of the present invention.

Next, a characteristic configuration of an example embodiment of the present invention will be described. FIG. 1 is a block diagram illustrating a characteristic configuration of the example embodiment of the present invention.

Referring FIG. 1, a classification model learning system 100 (information processing system) includes a learning data storage unit 110 and a learning unit 130. The learning data storage unit 110 stores pieces of learning data each of which has been classified as a positive example or a negative example. The learning unit 130 learns a classification model in such a way that a precision ratio of classification by the classification model is made larger under a constraint of a minimum value of a recall ratio of classification by the classification model.

According to the example embodiment of the present invention, it is possible to learn a classification model with a high precision ratio at a high recall ratio. The reason is that the learning unit 130 learns a classification model in such a way that a precision ratio of classification by the classification model is made larger under a constraint of a minimum value of a recall ratio of classification by the classification model.

Thereby, it is possible to prevent the number of times that a negative example is classified as a positive example from increasing, even if a smaller value is assigned to a decision threshold value which is applied to a classification probability outputted by a classification model (a threshold value for deciding as a phenomenon to be monitored) in order to monitor important phenomena without overlooking. Accordingly, in comparison with the case that phenomena are classified by using a typical logistic regression method, even if the same decision threshold value is used (even if a ratio of phenomena omitted from phenomena to be monitored is the same), the number of phenomena to be monitored is decreased, and consequently a monitoring cost is decreased. Moreover, even if the number of phenomena to be monitored is the same (a monitoring cost is the same), it is possible to make the threshold value smaller and decrease a ratio of phenomena omitted from phenomena to be monitored.

While the invention has been particularly shown and described with reference to example embodiments thereof, the invention is not limited to these embodiments.

For example, in the example embodiment of the present invention, it is exemplified that the classification model learning system 100 learns a classification model used for monitoring texts containing a critical contents. However, a classification model learned by the classification model learning system 100 is not limited to the above mentioned classification model. Another classification model may be applicable as far as important phenomena such as a sign of system fault are monitored without overlooking. In the case of monitoring the sign of system fault, for example, an amount of usage of a resource obtained from the system, or a detection value of a sensor is used as a feature value of a feature vector. Then, data in which the amount of usage of the resource, or the detection value of the sensor indicates a critical state is classified as data to be monitored.

This application is based upon and claims the benefit of priority from Japanese Patent Application No. 2014-238829, filed on Nov. 26, 2014, the disclosure of which is incorporated herein in its entirety by reference.

INDUSTRIAL APPLICABILITY

The present invention is applicable to a system for monitoring important phenomena without overlooking.

REFERENCE SIGNS LIST

100 Classification Model Learning System
101 CPU
102 Storage Device
103 Communication Device
104 Input Device
105 Output Device
110 Learning Data Storage Unit
120 Classification Model Storage Unit
130 Learning Unit
140 Optimization Problem Generation Unit
141 Objective Function Generation Unit
142 Constraint Generation Unit
150 Parameter Estimation Unit

The invention claimed is:

1. An information processing system, comprising:

a memory storing instructions, and one or more processors configured to execute the instructions to:

store pieces of learning data each of which has been classified as a positive example or a negative example;

learn, by using the pieces of learning data, a classification model in such a way that a precision ratio of classification by the classification model is made larger under a constraint of a minimum value of a recall ratio of classification by the classification model, wherein the classification model is a function that outputs a probability of classification of data as a positive example or a negative example; and generate a constrained optimization problem in which a constraint relating to the minimum value of the recall ratio and an objective function relating to the precision ratio are set, the constraint being expressed by parameters of the function of the classification model, the objective function being expressed by the parameters, and the parameters are estimated by finding out a solution of the constrained optimization problem.

2. The information processing system according to claim 1, wherein the recall ratio is defined, for each of positive examples, as an expected value of the number of times that each of the positive examples is classified as a positive example.

3. The information processing system according to claim 1, wherein the recall ratio is defined, for all of the positive examples, as an expected value of the number of times that a positive example is classified as a positive example among all of the positive examples.

4. The information processing system according to claim 1, wherein the objective function is defined as an objective function to make an expected value of the number of times that a negative example is classified as a positive example smaller.

5. The information processing system according to claim 4, wherein the objective function includes at least one of an objective function to make a value of an expression in which a value obtained by multiplying an expected value of the number of times that a negative example is classified as a positive example by a positive coefficient is set to a numerator or a value obtained by multiplying the expected value by a negative coefficient is set to a denominator smaller, and an objective function to make a value of an expression in which a value obtained by multiplying an expected value of the number of times that a negative example is classified as a positive example by a negative coefficient is set to a numerator or a value obtained by multiplying the expected value by a positive coefficient is set to a denominator larger.

6. The information processing system according to claim 1, wherein the objective function includes a regularization term relating to the parameters.

7. The information processing system according to claim 1, wherein
the classification model is a logistic regression model.

8. An information processing method, comprising:
obtaining pieces of learning data each of which has been classified as a positive example or a negative example;
learning, by using the pieces of learning data, a classification model in such a way that a precision ratio of classification by the classification model is made larger under a constraint of a minimum value of a recall ratio of classification by the classification model, wherein the classification model is a function that outputs a probability of classification of data as a positive example or a negative example; and
generate a constrained optimization problem in which a constraint relating to the minimum value of the recall ratio and an objective function relating to the precision ratio are set, the constraint being expressed by parameters of the function of the classification model, the objective function being expressed by the parameters, and the parameters are estimated by finding out a solution of the constrained optimization problem.

9. A non-transitory computer readable storage medium recording thereon a program causing a computer to perform a method comprising:
obtaining pieces of learning data each of which has been classified as a positive example or a negative example;
learning, by using the pieces of learning data, a classification model in such a way that a precision ratio of classification by the classification model is made larger under a constraint of a minimum value of a recall ratio of classification by the classification model, wherein the classification model is a function that outputs a probability of classification of data as a positive example or a negative example; and
generate a constrained optimization problem in which a constraint relating to the minimum value of the recall ratio and an objective function relating to the precision ratio are set, the constraint being expressed by parameters of the function of the classification model, the objective function being expressed by the parameters, and the parameters are estimated by finding out a solution of the constrained optimization problem.

* * * * *